Oct. 3, 1961  J. W. STEWART  3,002,230
METHOD FOR MAKING RUBBER SHOES
Filed Oct. 11, 1957

Inventor
James W. Stewart
by Roberts, Cushman & Grover
Attys

3,002,230
METHOD FOR MAKING RUBBER SHOES
James W. Stewart, Providence, R.I., assignor to Marbill Company, Providence, R.I., a corporation of Rhode Island
Filed Oct. 11, 1957, Ser. No. 689,733
1 Claim. (Cl. 18—59)

This invention relates to the manufacture of shoes having bottoms of waterproof composition and has for its principal objects to provide an improved method and apparatus for attaining greater uniformity in the finished shoe, better wearing characteristics, greater shoe comfort and an assembly line production with less wasted material and more economical use of the shoe making equipment.

As herein illustrated the apparatus comprises a plurality of bottom forming molds arranged to travel in succession along a predetermined path, to move each mold in succession by a series of stations, designed to carry out the necessary operation in making the shoe. At the first station there is a preheating oven for warming each mold, at the next a dispenser for depositing a measured quantity of liquid bottom forming compound into the empty mold, at the next means for concomitantly oscillating the mold to distribute the entire quantity of compound uniformly over the bottom and sides of the mold and to gel the same, so as to cause it to retain the form of a thin walled shell within the mold, at the next a dispenser for depositing a measured quantity of sponge-forming compound into the shell, at the next means for initiating activation of the sponge-forming compound, at the next a heater within which is contained a plurality of lasted uppers for warming and from which they may be removed one at a time and placed in contact with the rim of the shell and the surface of the sponge-forming compound, at the next an oven for concomitantly fusing the shell and sponge-forming compound with each other and to the upper, at the next a cooler for lowering the temperature of the mold and shoe to set the bond and at the next a stripping table at which the shoe may be stripped from the mold and the last from the shoe. Preferably, cooling is effected by moving the mold through a constantly circulating bath of water, and an air drier is provided for drying each mold as it emerges from the water bath and before it reaches the stripping table.

According to the method involved a measured quantity of bottom forming compound is deposited in a preheated mold, whereupon the latter is concomitantly oscillated and heated to distribute the bottom forming compound uniformly on the surface and sides of the mold and to cause the same to gel so as to form a thin shell within the mold. The shell is then partially filled with a predetermined quantity of sponge-forming composition and activation of the sponge-forming composition is initiated to swell it substantially to the level of the rim, whereupon a preheated lasted upper is placed in contact with the rim of the shell and with the surface of the activated sponge-forming compound. The assembly is then subjected to sufficient heat to fuse the shell and sponge-forming compound to each other and to the bottom of the upper. Finally the assembly is cooled to consolidate the bond and the shoe is stripped from the mold and the last from the upper.

As a last step in the continuous process, as each last is stripped from the mold another upper is lasted thereon, and the lasted uppers are transferred to the preheating container.

The invention will now be described in greater detail with reference to the accompanying drawings wherein.

Figure 2:
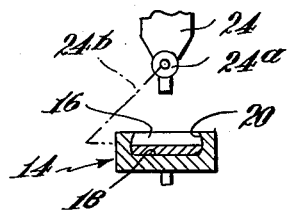
FIG. 2 is a section taken on the line 2—2 of FIG. 1, showing the dispenser for depositing the initial quantity of bottom forming compound in the empty mold.

Referring to the drawings, there is an endless conveyor 10, of suitable kind, mounted to travel in a predetermined path, here shown as having transversely spaced, parallel runs joined at their ends by semi-circular runs  A plurality of molds 12 are fastened to the conveyor at uniformly spaced intervals. Each mold, as shown in FIG. 2, is comprised of an aluminum block 14 which contains a mold cavity 16 having a bottom 18 corresponding in area and shape to the bottom of the shoe to be made and a peripheral wall 20 corresponding in height to the height of the bottom thickness wanted. The wall 20 slopes inwardly near its rim, being concave so that the top opening of the mold is somewhat smaller in area than the bottom and corresponds substantially to the profile of the shoulder of the last, on which the upper is drawn. It is to be understood however that the walls may be perpendicular, if desired, without departing from the spirit of the invention herein disclosed. The bottom surface of the mold and the wall may be appropriately contoured to provide for a ground gripping external surface on the bottom and a decorative edge. The convexity of the wall 20 shapes the edge so that when the bottom is attached to the upper it makes a neat pleasing appearance at the junction with the upper.

The molds 12 are detachably connected to the conveyor 10 so that molds of different size may be substituted therefor, to make shoes of different size and obviously the mold cavities may be varied to produce whatever bottom character is desired.

Figure 1:
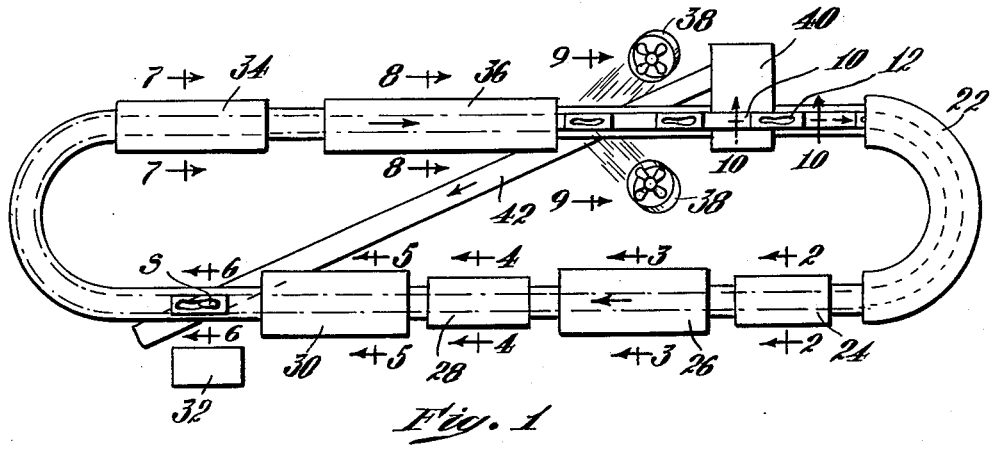
FIG. 1 is a diagrammatic layout of an apparatus for carrying out the method herein described.
Figure 3:
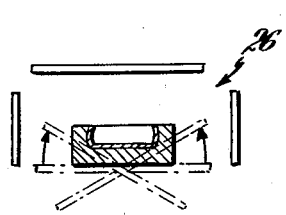
FIG. 3 is a section taken on the line 3—3 of FIG. 1, showing the mold subject to oscillation and heating to produce a shell within it.
Figure 4:
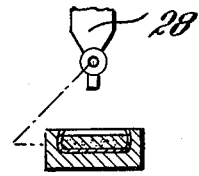
FIG. 4 is a section taken on the line 4—4 of FIG. 1, showing the dispenser for depositing the sponge forming composition in the shell.
Figure 5:
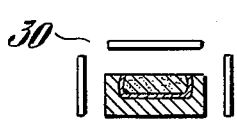
FIG. 5 is a section taken on the line 5—5 of FIG. 1, showing the oven for initiating activation of the sponge-forming compound.
Figure 6:
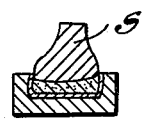
FIG. 6 is a section taken adjacent the means for preheating the last, showing a last and upper engaged with the rim of the shell and the surface of the sponge.
Figure 7:
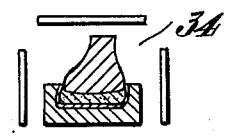
FIG. 7 is a section taken on the line 7—7 of FIG. 1, showing the oven for fusing the bottom to the upper.
Figure 8:
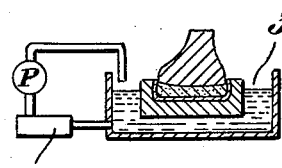
FIG. 8 is a section taken on the line 8—8 of FIG. 1, showing the circulating cooling bath.
Figure 9:
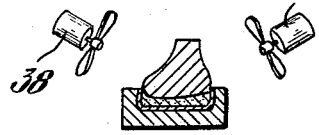
FIG. 9 is a section taken on the line 9—9 of FIG. 1, showing the air drier.
Figure 10:
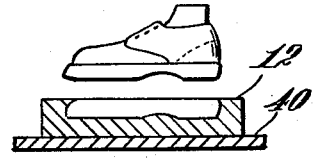
FIG. 10 is a section taken on the line 10—10 of FIG. 1, showing the finished shoe stripped from the mold.

The conveyor 10 is driven so as to travel constantly along the prescribed path by appropriate motivating means and thereby to move the molds with reference to a number of operating stations, at which stations there are means for performing the operations necessary to the manufacture of the shoe. Starting at the right-hand end of the diagrammatic layout and at the top run of the conveyor, as seen in FIG. 1, there is shown an empty mold 12 which is indicated as travelling toward the right by the arrow preceding it. At the semi-circular end of the diagram there is a semi-circular oven 22 through which the conveyor passes and through which the empty mold travels, as indicated in dotted lines. During the period that an empty mold travels through the oven it is brought up to a uniform temperature of approximately 300° F. At the exit end of the oven 22, along the lower parallel run of the conveyor, there is a dispenser 24 (FIG. 2), which contains a quantity of liquid bottom forming compound. The dispenser is provided with a measuring valve 24a or its equivalent and as the empty mold passes by the dispenser the valve is actuated through suitable mechanical or electrical means 24b, responsive to the presence of the mold or timed with the travel of the conveyor to deposit a measured quantity of the compound into the mold. The quantity will, of course, depend upon the size of the mold and the character of the shoe being made and these will be determined beforehand and proper settings of the valve made so that the right quantity will be deposited for the particular kind of shoe being made. As the mold travels toward the left with the liquid compound therein it enters an oven 26 (FIG. 3) for heating of the mold and its content and at the same time is oscillated by suitable cams in the manner described in the pending application of Maurice C. Smith, Jr., Serial No. 648,870, filed March 27, 1957. The effect of the oscillation is to distribute the entire quantity of bottom forming compound uniformly over the bottom and side walls of the mold so as to form a uniformly thick layer and to gel this layer as it is formed so that it retains its formation and provides a shell-like structure within the mold. The walls of the shell correspond in height and shape to the walls of the mold. A temperature in the order of 375° F. to 400° F. is effective. As the shell lined mold emerges from the oven 26 it passes by a second dispenser 28 (FIG. 4), which is suitably operated to deposit a measured quantity of sponge-forming composition into the shell. Continued progress of the mold with the sponge-forming composition therein moves it into an oven 30 (FIG. 5), wherein the sponge-forming composition is partially activated to cause the composition to swell up to the level of the rim of the shell and to take on sponge-like characteristics. Activation is carried out at a relatively slow rate and at a relatively low temperature so as to produce uniform cell formation. At the left end of the oven 30 there is an oven 32 situated beside the conveyor which contains a quantity of lasted uppers, that is, lasts upon which upper assemblies have been previously mounted and attached by suitable known lasting apparatus. The lasted uppers S are warmed within the oven 32 to a temperature approximating that at which the mold and its content have when they emerge from the oven 30 and these are withdrawn from the oven one at a time and placed bottom down with their bottoms engaged with the rim of the shell and with the surface of the partially activated sponge filling (FIG. 6), whereupon the assembly moves around the semi-circular left end of the conveyor and into the end of a fusing oven 34 (FIG. 7), near the left end of the upper run. As the assembly passes through the oven 34 it is raised to a temperature high enough to effect concomitant fusing of the shell and sponge filling to each other and to the bottom of the upper. A temperature in the order of 375° F. to 400° F. is effective. Union of the bottom and the upper is consummated in a cooling chamber 36 (FIG. 8), beyond the oven 34, in which there is a tray containing water which is constantly circulated and may be pumped through a refrigerator 36a to keep it cool. Only the mold has contact with the cool water and as the mold travels therethrough it is cooled down to substantially room temperature, as is also the last and the shoe, although these do not have contact with the water. At the right end of the cooling chamber there is mounted a pair of fans 38—38 (FIG. 9), one at each side of the conveyor, which blows dry air on the mold so as to dry it. Following the drying fans there is a stripping table 40 (FIG. 10), at which place an operator strips the shoe from its mold so that it can continue on empty toward the preheating oven 22 for its next round and strips the last from the shoe. At this station there is also a conveyor 42 which extends therefrom diagonally beneath the conveyor 10 to the preheating oven 32 for conveying the lasts which have been stripped from the finished shoe and upon which new uppers have been lasted to the preheating oven 32.

The method practiced in accordance with the apparatus herein described is one in which a predetermined quantity of bottom forming compound is deposited in a preheated mold so that the compound will not be chilled when it contacts the mold, so that the time required to raise the mold to a temperature to produce gelation is lessened and so that the temperature of the mold will be uniform in spite of differences in wall thickness. Uniform mold temperature is effected herein by a fairly long travel through the oven 22 so that when the mold emerges for deposition of the bottom forming compound all parts of it are of uniform temperature and hence during the gelation period uniform gelling will take place and hence uniform wall thickness will result.

In further accordance with the method, the distribution of the liquid bottom compound is carried out as described in the aforesaid pending application, wherein the mold is oscillated during gelation and the quantity of compound is predetermined so that the entire amount is distributed with no excess to be poured off. This insures a smooth uniformly thick shell which is gelled throughout, as distinguished from such methods of operation as results from sloshing an excess quantity of compound in the mold and then pouring out the remainder so that the interior is ungelled liquid. Following gelation the shell is partially filled with a predetermined quantity of sponge-forming compound and the latter is then activated to initiate sponge formation. As the sponge fills the shell a preheated upper is placed bottom down so as to have contact with the rim of the shell and the surface of the partially activated sponge-filling. The assembly is then subjected to fusing so as concomitantly to unite the shell and sponge-forming layer with each other and with the bottom of the upper. The bond is consummated by cooling the assembly and then the shoe is removed from the mold and the last is removed from the upper.

It is evident that the progress of the mold and the various operations performed in fabricating the bottom in attaching the upper thereto may be carried out on apparatus of different geometrical shape than that shown herein and with various kinds of ovens, compound dispensing means and cooling means without departing from the spirit of the invention.

The composition employed in the manufacture of the bottom shell is known as "plastisol," which is a polyvinyl chloride resin dispersed in a liquid plasticizer along with suitable colors, stabilizers and other modifying agents. For ease in use the compound has a low viscosity so as to be easily pourable. Such compounds may be fused with substantially no shrinkage so that it takes a very accurate and faithful impression of the mold. The sponge-forming composition is a polyvinyl chloride in which there is incorporated suitable foaming agents. It is to be understood that while plastisol is employed herein any equivalent composition may be substituted therefor.

The upper material may be of any suitable and desired form and is usually a woven fabric such as is commonly used in making athletic, tennis and play shoes, although it is to be understood that leather and leather-like uppers may be employed when called for.

It should be understood that the present disclosure is for the purpose of illustration only and that this invention includes all modifications and equivalents which fall within the scope of the appended claim.

I claim:

In a continuous process, that method of making shoes which comprises moving a plurality of open-top, sole molds in succession along a predetermined path, and while the molds are moving, preheating each mold in turn to a uniform predetermined temperature; thereafter depositing a measured quantity of liquid plastic bottom-forming compound in each mold sufficient to form a shell therein without having to discharge any excess; thereafter subjecting each mold to further heating for a sufficient length of time to bring about gelling without fusion of said compound, and at the same time oscillating the mold to cause the entire quantity of liquid compound to spread out uniformly on the bottom and side walls of the mold while it is gelling to form the shell; thereafter depositing a measured quantity of sponge-forming composition in the shell within the mold sufficient, when expanded, to substantially fill the shell without excess; subjecting the mold containing the shell and sponge-forming compound to further heat sufficient to gel the sponge compound without fusion, the sponge-forming compound being gelled substantially to the rim of the shell therewith to form an embryo bottom member; thereafter placing on the exposed surface of said sponge an upper which has been assembled on an unsupported last and preheated to a temperature corresponding to the temperature of the bottom member, the last and mold being held together solely by gravity; subjecting the engaged parts to heat to unite and fuse them; and thereafter cooling the united parts, removing the shoe from the mold and stripping it from the last.

References Cited in the file of this patent

UNITED STATES PATENTS

| | | |
|---|---|---|
| 2,221,695 | Robertson | Nov. 12, 1940 |
| 2,256,329 | Szerenyi et al. | Sept. 16, 1941 |
| 2,298,227 | Pinkerton et al. | Oct. 6, 1942 |
| 2,330,989 | Nevills | Oct. 5, 1943 |
| 2,694,871 | Rollman | Nov. 23, 1954 |
| 2,743,483 | Parini | May 1, 1956 |
| 2,744,340 | Gerber | May 8, 1956 |
| 2,786,237 | Keen et al. | Mar. 26, 1957 |
| 2,795,822 | Long | June 18, 1957 |
| 2,885,733 | Chupa | May 12, 1959 |
| 2,916,765 | Heller | Dec. 15, 1959 |